Dec. 11, 1962
M. S. EFRON
3,068,156
METHOD OF PRODUCING MOLDS FOR MOLDING GLOVES
Filed July 18, 1960
2 Sheets-Sheet 1
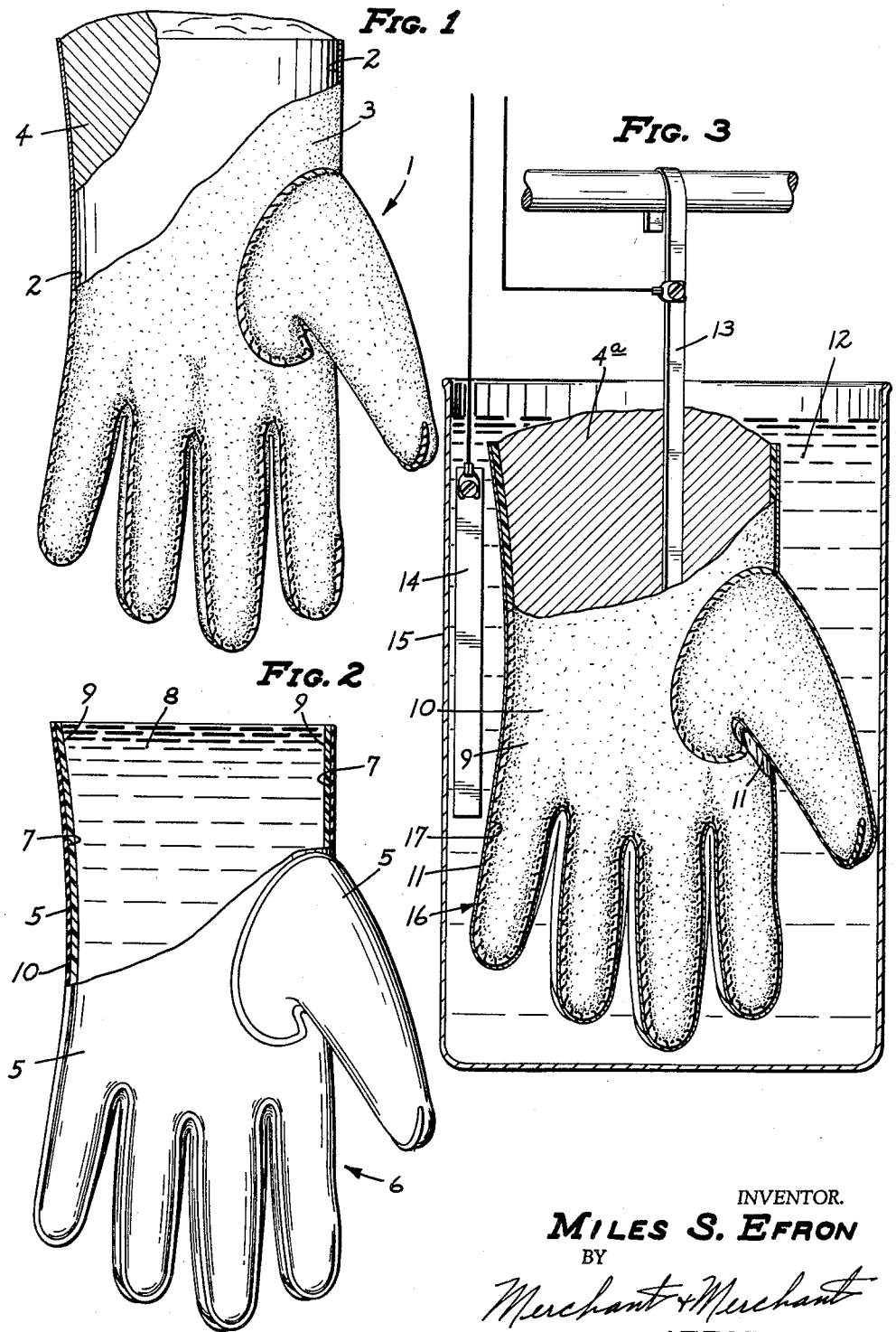
INVENTOR.
MILES S. EFRON
BY
Merchant & Merchant
ATTORNEYS Dec. 11, 1962  M. S. EFRON  3,068,156
METHOD OF PRODUCING MOLDS FOR MOLDING GLOVES
Filed July 18, 1960  2 Sheets-Sheet 2
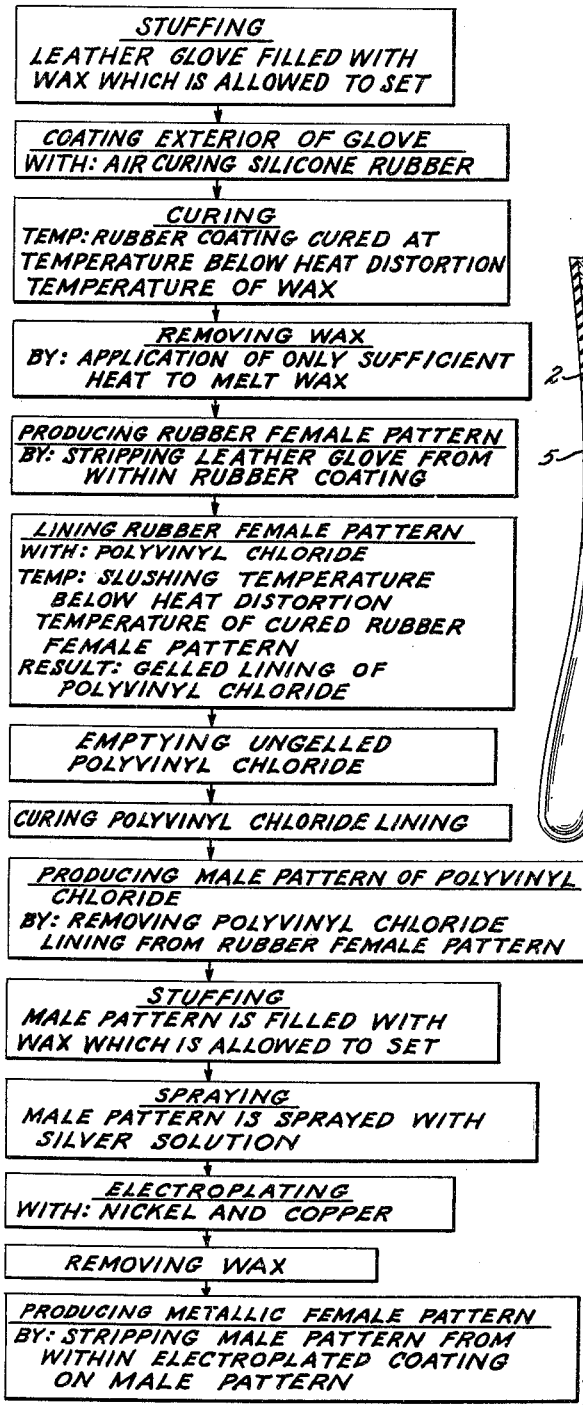
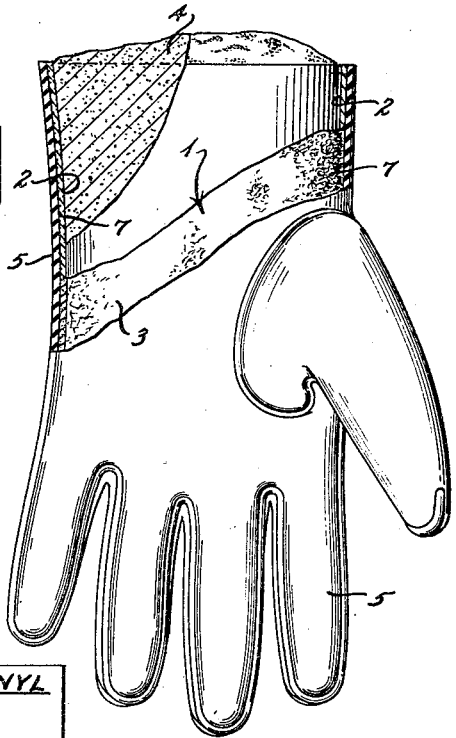
FIG. 4
FIG. 5
INVENTOR
MILES S. EFRON
BY Merchant & Merchant
ATTORNEY

United States Patent Office 3,068,156
Patented Dec. 11, 1962

1

3,068,156
METHOD OF PRODUCING MOLDS FOR
MOLDING GLOVES
Miles S. Efron, Minneapolis, Minn., assignor, by mesne
assignments, to United Electro Plastics Corporation, a
corporation of Minnesota
Filed July 18, 1960, Ser. No. 43,409
5 Claims. (Cl. 204—9)

This invention relates generally to the glove making art, and more particularly it relates to a method of producing molds for the production of simulated leather gloves.

An object of this invention is the provision of a method of producing molds for the production of gloves which are characterized by the exact design, texture, and grain appearance of the leather glove pattern from which they are produced whereby to provide a method for the manufacture of simulated leather gloves.

Another object of this invention is the provision of a method of producing molds for the production of simulated leather substantially impervious gloves having a substantially uniform material thickness.

Another object of this invention is the provision of a method of producing molds which enables the production of a great number of molds without repetition of the entire method of making the same.

The above and still further objects of this invention will become apparent from the following detailed specification, appended claims, and attached drawings.

Referring to the drawings wherein like reference characters indicate like parts or elements throughout the several views:

FIG. 1 is an elevational view showing the initial steps of my invention, some parts being broken away and some parts shown in section;

FIG. 2 is an elevational view showing further steps of my invention, some parts being broken away and some parts shown in section;

FIG. 3 is an elevational view showing still further steps in the practice of my invention, some parts being broken away and some parts shown in section;

FIG. 4 is a view showing the coating of the exterior of the glove and also showing the associated parts in section; and FIG. 5 is a block or flow diagram showing the sequence of steps comprising the disclosed invention.

Referring with greater particularity to the drawings, the reference numeral 1 represents a leather glove in its entirety, the interior thereof being represented by the reference numeral 2 and the exterior thereof being represented by the reference numeral 3.

The first step of my novel method is illustrated in FIG. 1, and consists of filling the leather glove 1 with wax 4 in liquid form and allowing the same to become congealed. After the wax 4 becomes set, a relatively rigidly air-curing silicone rubber 5 is applied to the exterior 3 of the glove 1, and the rubber coating 5 is permitted to cure in the conventional manner. The rubber coating 5 may be applied in any suitable manner such as by dipping the glove 1 into a container, not shown, of the rubber to be used. It is preferable that silicone rubber be used in the immediately above-described step of my invention because the air-curing temperature thereof is lower than the heat distortion temperature of the wax 4 which is stuffed within the leather glove 1, and also because the cured silicone rubber 5 has a heat distortion temperature above the molding temperature of polyvinyl chloride, the latter of which is used in a subsequent step in my invention, as will hereinafter be described in detail.

After removing the wax 4 from within the leather glove 1, the leather glove 1 is then removed from within the cured rubber 5 so as to produce a rubber female pattern therefrom, the female pattern being represented in general by the reference numeral 6. The next step in practicing my novel method comprises preheating the rubber female pattern 6 to a temperature of approximately 250° F. to 300° F., and then slushing the interior 7 of the rubber female pattern 6 with a polyvinyl chloride liquid 8. Then the polyvinyl chloride solution 8 is allowed to gel about the interior 7 of the female pattern 6 until a predetermined thickness is acquired thereabout, as seen particularly in FIG. 2. It is preferred that polyvinyl chloride be used for this step of my invention because it has a medium range molding temperature (approximately 250° F.–325° F.), which temperature is suitably below the heat distortion temperature of the silicone rubber which is used to form the rubber female pattern 6, and also because it has the requisite strength and other physical properties when cured to permit the formation of a great number of secondary female patterns therefrom, as will hereinafter be described. Then the ungelled polyvinyl chloride 8 is poured from within the rubber female pattern 6 so as to produce a polyvinyl chloride lining 9 about the interior 7 of the rubber female pattern 6.

Following formation of the polyvinyl chloride lining 9, the same is cured while it is still within the rubber female pattern 6 so as to add rigidity to the lining 9. After the lining 9 and the rubber female pattern 6 have cooled, the lining 9 is removed from within the female pattern 6, as by the use of vacuum means, not shown, so as to produce a thin-walled hollow male pattern therefrom, the same being represented by the same reference numeral 9 as represents the uncured lining from which the male pattern 9 is formed. Then the male pattern 9 is filled with wax 4a in liquid form, and the same is allowed to cool and thereby become set. After the wax 4a is congealed, the exterior 10 of the male pattern 9 is coated, as by spraying, with a silver solution, whereby to provide a conductor for subsequent electroplating of a metallic coating upon the male pattern 9, as will hereinafter be explained. The metallic coating, including that produced by the silver solution, is represented in its entirety by the reference numeral 11. In accordance with this invention, it has been determined that the metallic coating 11 may satisfactorily be formed by the addition of an electroplated coating of nickel and a subsequent electroplated coating of copper to the previously applied coating of the silver solution, the foregoing being preferably applied in the order given. Since the methods of silver spraying and the methods of electroplating and electro-deposition are well known in the art, the particulars thereof will not be specifically set forth. However, conventional plating apparatus is shown in FIG. 3, and comprises a plating solution 12, a cathode 13, an anode 14, and a suitable container 15.

After the metallic coating 11 attains a predetermined thickness, the same is separated from the male pattern 9 so as to form a metallic female mold, represented in its entirety by the reference numeral 16. It should be noted that the metallic female mold 16 is an extremely durable and strong final mold from which the glove product, not shown, may be efficiently formed in a manner which will be hereinafter particularly set forth. It should be obvious that a great number of metallic female molds may be formed on the polyvinyl chloride male pattern 9 in the above-described manner without repeating the steps previous thereto.

The remaining steps of my invention concern the formation of polyvinyl chloride gloves, not shown, within the metallic female mold 16 in a manner similar to the formation of the polyvinyl chloride male pattern 9 within the rubber female pattern 6, as described above and shown in FIG. 2. FIG. 2 is therefore thought to be sufficient to illustrate this final portion of my method, which comprises slushing the interior 17 of the metallic female mold 16 with a polyvinyl chloride liquid, not shown, and allowing the same to gel about the interior 17 of the metallic female mold 16 until the desired thickness of the glove product to be produced thereby is acquired thereabout. Then the ungelled polyvinyl chloride, not shown, is poured from within the metallic female mold 16 so as to produce a glove-defining lining, not shown, about the interior 17 of the metallic female mold 16. Then the glove-defining lining, not shown, is cured in the conventional manner and is thereafter removed from the metallic female mold 16 whereby to produce a glove, not shown, and render the mold 16 usable for the production of more gloves in the same manner as described above.

This invention has been thoroughly tested and found to be completely satisfactory for the accomplishment of the above objects; and while I have shown a preferred embodiment thereof, I wish it to be specifically understood that the same may be modified without departure from the scope and spirit of the appended claims.

What I claim is:

1. The method of producing a mold for use in the manufacture of one piece simulated leather gloves, said method comprising filling the interior of a flexible leather glove with a first thermoplastic material in liquid form and allowing same to become set to render the glove relatively rigid, coating the exterior of said rigidified glove with a relatively rigidly curing silicone rubber which is separable from said glove upon curing, curing said rubber coating, the curing temperature of said rubber being lower than the heat distortion temperature of said first thermoplastic material, removing said first thermoplastic stuffing material by liquifying said first thermoplastic material thereby rendering said glove again flexible to facilitate the removal thereof from within the cured rubber, removing said flexible glove from within said cured rubber so as to produce a rubber female pattern therefrom, coating the interior of said rubber female pattern with a generally uniform lining of a second thermoplastic material which is stronger than said first thermoplastic material and which is separable from said cured silicone rubber upon curing, said second thermoplastic material having a lower curing temperature than the heat distortion temperature of said rubber, curing said lining to form a hollow male pattern, removing said lining from said rubber female pattern so as to leave said female pattern intact, thereafter introducing into the hollow male pattern a hardenable thermoplastic material and permitting the same to harden to render the male pattern relatively rigid, coating the exterior of said male pattern with metal, and separating said metal coating from said male pattern so as to form a metallic female mold, the interior of which simulates the reverse of the surface characteristics of said glove.

2. The method of producing a mold for use in the manufacture of one piece simulated leather gloves, said method comprising filling the interior of a flexible leather glove with a first thermoplastic material in liquid form and allowing same to become set to render the glove relatively rigid, coating the exterior of said rigidified glove with a relatively rigidly curing silicone rubber which is separable from said glove upon curing, curing said rubber coating, the curing temperature of said rubber being lower than the heat distortion temperature of said first thermoplastic material, removing said first thermoplastic stuffing material by liquifying said first thermoplastic material thereby rendering said glove again flexible to facilitate the removal thereof from within the cured rubber, removing said flexible glove from within said cured rubber so as to produce a rubber female pattern therefrom, coating the interior of said rubber female pattern with a generally uniform lining of a second thermoplastic material which is stronger than said first thermoplastic material and which is separable from said cured silicone rubber upon curing, said second thermoplastic material having a lower curing temperature than the heat distortion temperature of said rubber, curing said lining to form a hollow male pattern, removing said lining from said rubber female pattern so as to leave said female pattern intact, thereafter introducing into the hollow male pattern a hardenable thermoplastic material and permitting the same to harden to render the male pattern relatively rigid and electroplating the exterior of said male pattern so as to form a metallic female mold, the interior of which simulates the reverse of the surface characteristics of said glove.

3. The method of producing a mold for use in the manufacture of one piece simulated leather gloves, said method comprising filling the interior of a flexible leather glove by pouring therein a first thermoplastic material in liquid form and allowing same to become set to render the glove relatively rigid, coating the exterior of said rigidified glove with a relatively rigidly curing silicone rubber which is separable from said glove upon curing, curing said rubber coating, the curing temperature of said rubber being lower than the heat distortion temperature of said first thermoplastic material, removing said first thermoplastic material by applying heat thereto to liquify said first thermoplastic material, thereby rendering said glove again flexible to facilitate the removal thereof from within the cured rubber, removing said glove from within said cured rubber so as to produce a rubber female pattern therefrom, coating the interior of said rubber female pattern with a generally uniform lining of a second thermoplastic material which is stronger than said first thermoplastic material and which is separable from said cured silicone rubber upon curing, said second thermoplastic material having a lower curing temperature than the heat distortion temperature of said rubber, curing said lining while it is still within said rubber female pattern to form a hollow male pattern, removing said lining from said rubber female pattern so as to leave said female pattern intact, thereafter introducing a hardenable thermoplastic material into the hollow male pattern and permitting the same to harden to render the male pattern relatively rigid, electroplating the exterior of said male pattern with a thick plating of metal, and separating said metal plating from said male pattern so as to form a metallic female mold, the interior of which simulates the reverse of the surface characteristics of said glove.

4. The method of producing a mold for use in the manufacture of one piece simulated leather gloves, said method comprising filling the interior of a flexible leather glove by pouring wax therein in liquid form and allowing same to become set to render the glove relatively rigid, coating the exterior of said rigidified glove with a relatively rigidly air-curing silicone rubber which is separable from said glove upon curing, curing said rubber coating, the air-curing temperature of said rubber being lower than the heat distortion temperature of said wax, removing said wax by applying heat thereto to liquify said wax thereby rendering said glove again flexible to facilitate the removal thereof from within the cured rubber, removing said glove from within said cured rubber so as to produce a rubber female pattern therefrom, coating the interior of said rubber female pattern with a generally uniform lining of a vinyl resin material, said vinyl resin material having a lower curing temperature than the heat distortion temperature of said rubber and is separable from said rubber upon curing, curing said lining while it is still within said female pattern to form a hollow male pattern, removing said lining from said rubber female pattern so as to leave said female pattern intact, thereafter introducing a hardenable thermoplastic material into the hollow male pattern and permitting the same to harden to render the male pattern relatively rigid, electroplating the exterior of said male pattern with a thick plating of metal, and separating said metal plating from said male pattern so as to form a metallic female mold, the interior of which simulates the reverse of the surface characteristics of said glove.

5. The method of producing a mold for use in the manufacture of one piece simulated leather gloves, said method comprising filling the interior of a flexible leather glove by pouring wax therein in liquid form and allowing same to become set to render the glove relatively rigid; coating the exterior of said rigidified glove with a relatively rigidly air-curing silicone rubber which is separable from said glove upon curing, curing said rubber coating, the air-curing temperature of said rubber being lower than the heat distortion temperature of said wax; removing said wax by applying heat thereto to liquify said wax thereby rendering said glove again flexible to facilitate the removal thereof from within the cured rubber; removing said glove from within said cured rubber so as to produce a rubber female pattern therefrom; after preheating said rubber female pattern, slushing the interior thereof with polyvinyl chloride in liquid form and allowing it to gel about the interior of said female pattern until a predetermined thickness is acquired thereabout, said polyvinyl chloride having a lower curing temperature than the heat distortion temperature of said rubber and is separable from said rubber upon curing; pouring off the ungelled polyvinyl chloride so as to produce a lining about the interior of said pattern; curing said lining while it is still within said female pattern to form a hollow male pattern; after said lining and said rubber female pattern have cooled, removing said lining from said rubber female pattern so as to leave said female pattern intact; stuffing said male pattern by pouring wax therein in liquid form and allowing same to become set; electroplating the exterior of said male pattern with a thick plating of metal; and separating said metallic coating from said male pattern so as to form a metallic female mold the interior of which simulates the reverse of the surface characteristics of said glove.

References Cited in the file of this patent

UNITED STATES PATENTS

| | | |
|---|---|---|
| 2,473,723 | Nelson | June 21, 1949 |
| 2,476,994 | Milton et al. | July 26, 1949 |
| 2,538,160 | Milton et al. | Jan. 16, 1951 |
| 2,788,555 | Sukacev | Apr. 16, 1957 |
| 2,949,410 | Bingham | Aug. 16, 1960 |